(12) United States Patent
Wang

(10) Patent No.: US 7,944,547 B2
(45) Date of Patent: May 17, 2011

(54) METHOD AND SYSTEM OF GENERATING 3D IMAGES WITH AIRBORNE OBLIQUE/VERTICAL IMAGERY, GPS/IMU DATA, AND LIDAR ELEVATION DATA

(76) Inventor: Zheng Wang, Boyds, MD (US)

( * ) Notice: Subject to any disclaimer, the term of this patent is extended or adjusted under 35 U.S.C. 154(b) by 0 days.

(21) Appl. No.: 11/685,276

(22) Filed: Mar. 13, 2007

(65) Prior Publication Data

US 2007/0269102 A1 Nov. 22, 2007

Related U.S. Application Data

(60) Provisional application No. 60/747,798, filed on May 20, 2006.

(51) Int. Cl.
*G01C 3/08* (2006.01)
(52) U.S. Cl. ............ 356/4.01; 356/3.01; 356/3.15; 356/4.1; 356/5.01; 356/5.1
(58) Field of Classification Search ........ 356/3.01–3.15, 356/4.01–4.1, 5.01–5.15, 6–22, 28, 28.5, 356/139.01–139.1
See application file for complete search history.

(56) References Cited

U.S. PATENT DOCUMENTS

| | | | | |
|---|---|---|---|---|
| 2002/0060784 | A1* | 5/2002 | Pack et al. ............ | 356/6 |
| 2003/0137646 | A1* | 7/2003 | Hoffman et al. ........ | 356/4.01 |
| 2006/0061566 | A1* | 3/2006 | Verma et al. .......... | 345/419 |

OTHER PUBLICATIONS

Haala, N. and Karl-Heinrich Acquisition of 3D urban Models by Analysis of Aerial Images, Digital surface Models and Existing 2D Building Informaiton 1997 SPIE Integrating Photogrammetric Techniques with Scene Analsis and Machine Vision III.*

* cited by examiner

*Primary Examiner* — Thomas H Tarcza
*Assistant Examiner* — Luke D Ratcliffe

(57) ABSTRACT

This invention relates to a three-dimensional image of ground surface and the method and system that generates the three-dimensional image. Here, a three-dimensional image is an image that has three-dimensional XYZ coordinates in a ground coordinate system for every pixel of the image and the ground surface means the bare-earth surface plus all the objects on the bare-earth surface. The scene covered and represented by such a three-dimensional image is a three-dimensional real world scene where everything visible in the three-dimensional image has three-dimensional coordinates. The three-dimensional XYZ coordinates of all the pixels of a three-dimensional image are attributed by the method and system of this invention for generating three-dimensional images with airborne oblique/vertical imagery, GPS/IMU, and LIDAR ground surface elevation or range data. On such a three-dimensional image, one can make direct measurements of location, length, distance, height, area, and volume and indirect measurements including but not limited to profile and sight of view all in the real world three-dimensional coordinate system. Additionally, application systems that utilize three-dimensional images can make three-dimensional displays or perspective views of the ground surface with fly-through or walk-through, rotations and zoom in and out, and three-dimensional manipulation and simulation of ground surface.

17 Claims, 4 Drawing Sheets

METHOD AND SYSTEM OF GENERATING 3D IMAGES WITH AIRBORNE OBLIQUE/VERTICAL IMAGERY, GPS/IMU DATA, AND LIDAR ELEVATION DATA

FIELDS OF THE INVENTION

This invention relates to the generation of a geo-referenced three-dimensional image (3D Image) of the ground surface, where ground surface means the bare-earth surface plus all the objects on the bare-earth surface and geo-referenced means measurable in a real world coordinate system for location, distance, height, area, volume, and direction for the ground surface. In terms of technology and science, the invention is in the fields of photogrammetry, remote sensing, and 3D ground surface modeling.

BACKGROUND OF THE INVENTION

Being able to see and sometimes to measure a real world scene in 3D on a computer is a natural desire of human being and also the need in many applications. The purpose of making 3D Images is to provide an effective and efficient foundation data and representation to the building of a geo-referenced 3D ground surface model (GR3DGSM). Such a GR3DGSM allows the viewing and measuring of the ground surface of the real world from aerial images, oblique or vertical, in 3D.

In order to model and present ground surface in the real world, one has to have the needed ground surface information and materials including the imagery that covers it and includes the facets of objects on the ground; the position and attitude information for the imagery and sensors used; and the ground surface elevation or range data that provides geometrical information for the bare-earth surface and the objects on the surface.

There are different methods to model and present the real world ground surface in 3D and each method determines its way of how and in what formats the data are to be captured and used. The representation of the 3D information plays the key role in any ground surface modeling method and can make huge differences among the different methods in effectiveness and efficiency to present the 3D real world.

In the past, a lot of researches and developments were conducted and a number of systems were developed for 3D ground surface modeling. In those systems, majority of them share a common method, which at present time acts like the "standard way" to create 3D ground surface models in the geospatial information industry. This "standard way" is to first collect and create 3D vector frame structures of ground surface objects (mainly buildings) in certain format by conventional photogrammetric processes and then attach facets to the buildings by manual cut and paste process from pictures of the buildings taken either on the ground or from aerial oblique imagery. Although the 3D building models created in this way normally look good, most of them are not geo-referenced in the real world coordinate system, i.e., they are not measurable. Further, the buildings that were not collected for various reasons (such as cost) and other ground objects, such as trees will look unreal and bad. In general, 3D ground surface models created in such way only look good at those buildings that were captured and look bad for those not captured. Additionally, the entire process to produce such a 3D ground surface model is very time consuming and labor intensive, particularly for the making of building facets, which so far limits its use only to a limited number of big cities.

In the last decade, many advancements in remote sensing technologies have created the necessary material conditions for the development of this invention, particularly the availability of the direct observation and measurement capability by Global Positioning System (GPS) for position, the Inertial Measurement Unit (IMU) for attitudes, Light Detection And Ranging (LIDAR) for high quality ground surface elevation or range data acquisition, and airborne digital oblique imagery acquisition camera system.

The direct and accurate observation of positions and attitudes from GPS and IMU respectively allows the direct exterior orientation determination for airborne oblique imagery, where the exterior orientation consists of positions and attitudes. In order to link an image to a common ground coordinate system, one has to know the six parameter exterior orientation of the image: i.e., the XYZ coordinates of the image exposure center for position and the three angles of the image exposure center in relation to the ground coordinate system for attitude both at the time of exposure. Conventionally, the determination of exterior orientation of airborne imagery, oblique or vertical imagery, is made through an aerial triangulation process, which would need ground control points and is very difficult to obtain accurate and reliable result for oblique imagery because of its oblique nature. With the direct and accurate observations of positions and attitudes for each and every image, there is no need to do aerial triangulation any more.

The LIDAR technology represents today's best way to acquire ground surface elevation or range data with high accuracy, high density, and high consistency in the quality for a large area in relatively short time. The ground surface elevation or range data collected by a LIDAR system cannot be easily, if can at all, matched by the today's conventional photogrammetric processes. Comparing the data produced by conventional photogrammetric processes with the data produced by LIDAR, most normally photogrammetric data only include major or large size objects such as buildings and roads, whereas LIDAR data includes everything of the ground surface without any discrimination for type and size of the objects of the ground surface.

People have been acquiring and using airborne oblique imagery for decades, mainly with film metric cameras. Here, an oblique image is one taken with the axis of the camera lens intentionally directed between the horizontal and the vertical and when the axis of the camera lens is set as nearly vertical, then the image taken is a vertical image (American Society of Photogrammetry and Remote Sensing. Manual of Photogrammetry, $4^{th}$ Edition, pp 279-280. Falls Church, Va.: ASPRS. 1980). In recent years, more and more multiple digital cameras, such as five-camera systems, are to be used to acquire oblique imagery. The great increase in the utilization of oblique imagery is mainly attributed to direct observation of exterior orientation parameters of imagery from GPS and IMU. The multiple camera oblique imaging system can quickly acquire imagery for a large area with high ground pixel resolution and image quality for ground object facets, especially for building facets.

The data acquired by using these technologies provides the necessary materials and conditions to create 3D Images and in turn to build an effective and efficient GR3DGSM of the real world by the method and system of this invention. Besides being the foundation data for a GR3DGSM, 3D Images can and should also serve as a foundational layer in the Geographic Information Systems (GIS). Currently, a typical GIS has a layer of geo-referenced two-dimensional (2D) orthophoto. Although on a 2D orthophoto, one can make many measurements, all the measurements are limited to 2D, i.e., only in XY plane, no third dimensional information available. In such a GIS, the world is only 2 dimensional. Having 3D Images in GISs will revolutionize the concept of a GIS and greatly expand the use of airborne imagery beyond the traditional professional users.

APPLICATIONS OF THE INVENTION

This invention provides a method and system to generate geo-referenced 3D Images of the ground surface of the real world. Any application that, in one way or another, needs 3D ground surface modeling of the real world, no matter it is for city or rural, flat, rolling, or mountainous terrain, can use the 3D Images generated by this invention to meet their needs.

One direct application of 3D Images is to use 3D Images as the foundational data of a system for GR3DGSM and therefore be able to directly create geo-referenced 3D ground surface models. In such a system, the 3D Images will allow the 3D measurements and directly display 3D perspective views of the ground surface with fly-through or walk-through, rotations and zoom in and out, and 3D manipulation and simulation of the ground surface. The fact that such a system is not rely on any vector based building models makes a fundamental distinction between this method and all vector based methods that build their 3D ground surface models based on vector models, and therefore avoids the time consuming and labor intensive processes associated with the vector based methods.

For a GR3DGSM system that is based on 3D Images, it can be used for many applications. For city modeling, such a GR3DGSM system allows a realistic viewing of a city environment with real buildings and their real facets, real trees, and all other real street settings. The realistic viewing of a city can be used for applications such as public security and safety, telecommunication, city planning and designing, simulations for city settings for movie industry, real estate, insurance, facility site simulations for monitoring and controlling, and so on.

For rural modeling, such a GR3DDGSM system can be used for realistic tourist sites demonstration and/or simulation, for military battle field simulation, for flood controlling and planning, for environmental monitoring, and so on.

The great effectiveness of 3D Images and the GR3DGSM built on 3D Images and high efficiency of generating 3D Images with the method and system of this invention give this invention great advantages over the conventional vector based methods in many aspects, particularly this invention does not need to do cut and paste to build building facets. In a 3D Image based GR3DGSM system, all building facets are automatically geo-referenced and automatically at where they suppose to be, which saves tremendous time and therefore reduces a lot of cost.

SUMMARY OF THE INVENTION

The invention described in this document relates to a 3D Image of ground surface and the method and system that generates the 3D Image. Here, a 3D Image is an image that has three-dimensional XYZ coordinates in a ground coordinate system for every pixel of the image. The scene covered and represented by such a 3D Image is a three-dimensional real world scene where every visible thing in the 3D Image has 3D coordinates. The three-dimensional XYZ coordinates of all the pixels of a 3D Image are attributed by the method and system of this invention that generates 3D Images with airborne oblique/vertical imagery, GPS/IMU, and LIDAR ground surface elevation or range data, which are to be described in this document. A 3D Image allows direct measurements of the location, length, distance, height, area, and volume and indirect measurements including but not limited to profile and sight of view all in 3D.

The generation of a 3D Image uses airborne oblique and/or vertical imagery for the pictures of the ground surface, GPS/IMU data for the geo-referencing of the imagery, and LIDAR data for ground surface elevations or ranges. The method and system of this invention can also use any other imagery with proper geo-referencing and/or ground surface elevation or range data sources.

DETAILED DESCRIPTION OF THE INVENTION

A 3D Image of ground surface of this invention is an image that has three-dimensional XYZ coordinates for every pixel of the image in a ground coordinate system. The scene covered and represented by such a 3D Image is a three-dimensional real world scene where every visible thing in the 3D Image has 3D coordinates. The three-dimensional XYZ coordinates of the pixels of a 3D Image are attributed by the method and system of this invention that generates 3D Images with airborne oblique/vertical imagery, GPS/IMU, and LIDAR ground surface elevation or range data.

The generation of a 3D Image uses airborne oblique and/or vertical imagery for the pictures of the ground surface, GPS/IMU data for the input imagery geo-referencing that puts the imagery in a ground coordinate system, and LIDAR data for ground surface elevations or ranges. The geo-referencing for the imagery and the LIDAR data have to be in a same ground coordinate system. The method and system of this invention can also use any other imagery with proper geo-referencing and/or ground surface elevation or range data sources.

Figure 1:
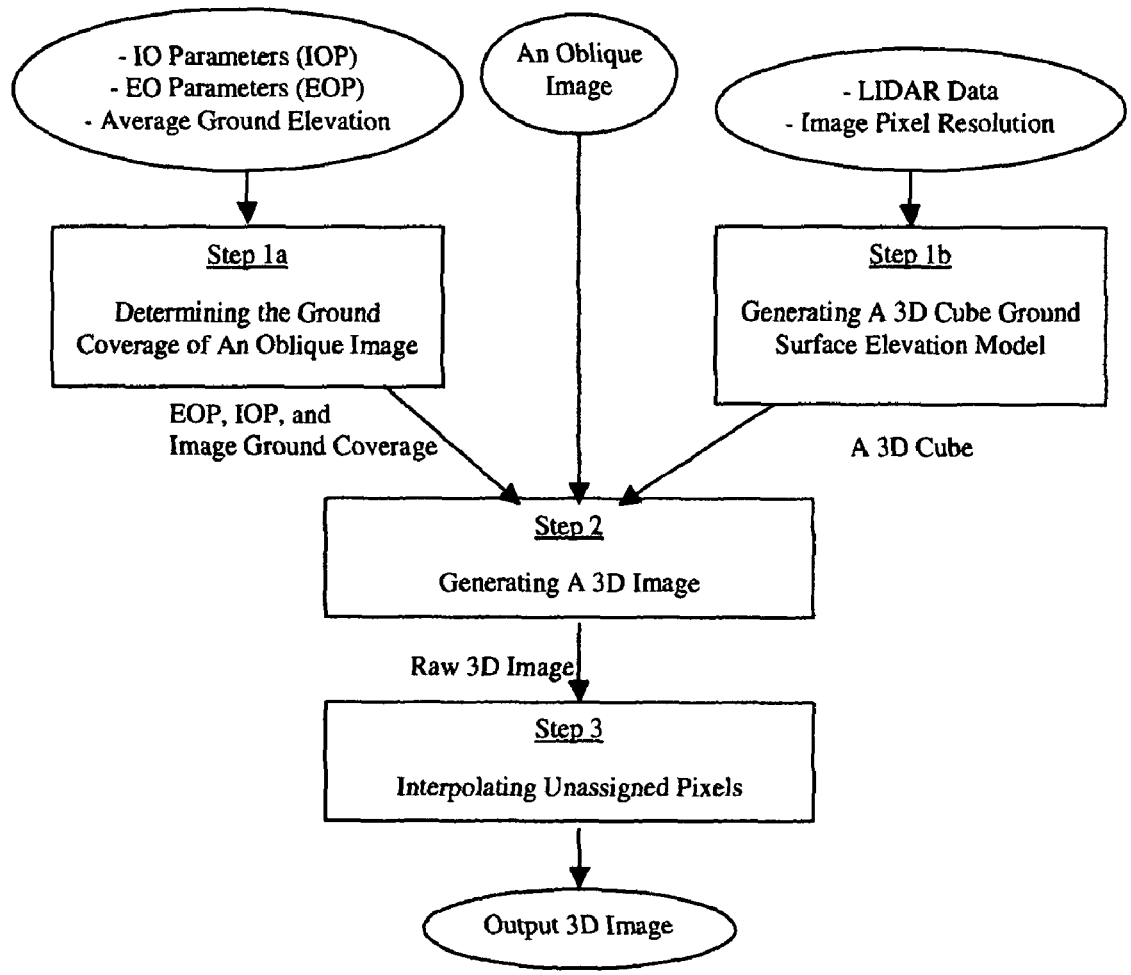
FIG. 1 depicts the flowchart of processes, procedures, and data flow of the method and system of generating a 3D Image with airborne oblique (or vertical) imagery, GPS/IMU, and LIDAR ground surface elevation or range data.

FIG. 1 depicts the processes and procedures of the method and system of generating a 3D Image with airborne oblique (or vertical) imagery, GPS/IMU, and LIDAR ground surface elevation or range data. It also shows the input(s) and output(s) of each process and the data flow of the entire system.

To make a 3D Image, the system takes following input data and given parameters:

- An oblique (or vertical) image.
- The exterior orientation parameters (EOPs) of the image including the exposure center of the image XYZ and the three attitude angles of the image for roll, pitch, and heading at the time of exposure.
- The interior orientation parameters (IOPs) of the image. When a digital camera is used, its interior orientation parameters should include focal length, principal point, and the radial distortion correction coefficients ($k1$, $k2$, and $k3$). Those parameters should be constant for all the images it takes.
- Average ground surface elevation, see the explanation of Step1$a$.

LIDAR ground surface elevation or range data. The LIDAR data should have fine point spacing (<=0.5 meter) and represent a reflective surface, i.e., it contains all the objects, such as buildings and trees on the bare-earth surface. The extracted bare earth data from a LIDAR data set should not be used. Additionally, the nominal ground pixel resolution of the oblique image is needed to determine the cell size of the 3D Cube that is used as ground surface elevation model for generating a 3D Image.

The exterior orientation parameters of the imagery and the ground surface elevation or range data (LIDAR data) must be in the same ground coordinate system.

The outputs of the system are as follows:

For each and every input image, a file with the same size (in terms of number of pixels) is generated, in which each and every pixel has 3D coordinates.

A separate ASCII file is generated as well for each image. The file contains the information of the image's ground coverage and neighboring images and other indexing information.

All 3D Images belonging to a common project area form an image database.

The processes and procedures of the method and system for generating 3D Images are as follows:

The system of generating 3D Images is divided into three steps: Step1, Step2, and Step3 see FIG. 1. Furthermore, Step1 consists of two parallel, independent processes, Step1*a* and Step1*b*. The execution of Step1*a* is independent of Step1*b*, and vice versa. However, Step1*a* and Step1*b* both have to be performed before Step2 and Step3 can be executed. The following sections describe the geometrical and mathematical models used in the processes, the conditions to apply those geometrical and mathematical models, and the procedures of the processes.

Step1*a*: Determining the Ground Coverage of an Oblique or Vertical Image

For an oblique image, in order to limit the computation in each process to only its ground coverage, the ground coverage of the image is calculated and represented by a quadrilateral (or square for a vertical image). In the calculation of the ground coverage quadrilateral of an oblique image, an estimated average ground elevation of the covered area is used, which essentially uses a flat terrain to represent the covered area. Using an average ground elevation to represent the covered area of an oblique image is valid based on following three observations: First, most applications of such 3D Images are for urban or suburban areas. Therefore within the ground coverage of an oblique image, the terrain elevation change is limited and can be treated as flat terrain. Second, for a large-scale oblique (or vertical) image, i.e., 1:2,000 scale or larger, its ground coverage is relatively small (e.g., 0.1 sq. miles), therefore again in the covered area the terrain elevation change is limited and can be treated as flat. And third, even for a small-scale image, 1:5,000 or smaller, the terrain elevation change in its coverage is relatively small comparing to its flying height above the ground, therefore using an averaged elevation for its covered terrain is still valid.

Based on the above observations, a flat terrain below the airplane by the amount of the flying height is used to determine the boundary of the ground coverage of each and every oblique (or vertical) image.

The Coverage: Based on the known/given exterior orientation and interior orientation parameters of an oblique or vertical image and the averaged ground elevation, the ground coverage of an oblique image is defined by a quadrilateral and its four corners are determined by the Collinearity equations (MIKHAIL, BETHEL, and McGLONE: Introduction to Modern Photogrammetry, pp 91-93. New York: John Wiley & Sons, 2001) in following Equations (1) and (2):

$$x - x_0 = -f \frac{m_{11}(X - X_O) + m_{12}(Y - Y_O) + m_{13}(Z - Z_O)}{m_{31}(X - X_O) + m_{32}(Y - Y_O) + m_{33}(Z - Z_O)} \quad (1)$$

$$y - y_0 = -f \frac{m_{21}(X - X_O) + m_{22}(Y - Y_O) + m_{23}(Z - Z_O)}{m_{31}(X - X_O) + m_{32}(Y - Y_O) + m_{33}(Z - Z_O)}$$

In Equation (1), $x_0$, $y_0$, are the principal point coordinates in the image plane of the camera that was used to take the image and f is the focal length of the camera. $X_0 Y_0 Z_0$ are the coordinates of the image exposure center in the ground coordinate system. $m_{11-31}$ are the coefficients of the rotation matrix defined in Equation (2) as follows:

$m_{11} = \cos \phi \cos \kappa$ $m_{12} = \cos \omega \sin \kappa + \sin \omega \sin \phi \cos \kappa$ $m_{13} = \sin \omega \sin \kappa - \cos \omega \sin \phi \cos \kappa$ $m_{21} = -\cos \phi \sin \kappa$ $m_{22} = \cos \omega \cos \kappa - \sin \omega \sin \phi \sin \kappa$ $m_{23} = \sin \omega \cos \kappa + \cos \omega \sin \phi \sin \kappa$ $m_{31} = \sin \phi$ $m_{32} = -\sin \omega \cos \phi$ $m_{33} = \cos \omega \cos \phi \quad (2)$ In Equation (2), $\omega \phi \kappa$ are the roll, pitch, and heading angles of the image's attitudes, respectively.

Step1*b*: Generating a 3D Cube for Ground Surface Elevation or Range Modeling

In the generation of 3D Images, ground surface elevation or range data is needed. In order to attribute 3D coordinates to each and every pixel of an oblique or vertical image, particularly to the pixels of building facets in the image, the ground surface elevation or range data has to be represented in a way that can reflect all facets of buildings or any ground objects. In this invention, such a representation called 3D Cube is developed. A 3D Cube represents not only the bare-earth surface but also all the objects, including but not limited to buildings, and their facets on the bare-earth surface.

The definition of a 3D Cube is as follows: A 3D Cube is a three-dimensional grid representation of the ground surface elevation, in which each grid cell is a square and has a constant size in horizontal plane (XY). And for each XY position, the 3D Cube stores two elevation values: maximum elevation (max_z) and minimum elevation (min_z). When a XY cell falls on a vertical surface, such as a building facet, the max_z value and min_z value of the cell will be different, with the max_z represents the highest elevation of the facet and the min_z represents the lowest elevation of the facet. Otherwise, the max_z and min_z of the cell will be same and both represent the single elevation of the cell. A typical example of such a cell is one on top of a building or simply on the ground.

| A 3 × 3 3D Cube example | | |
|---|---|---|
| max_z & min_z | max_z & min_z | max_z & min_z |

-continued

| A 3 × 3 3D Cube example | | |
|---|---|---|
| max_z & min_z | max_z & min_z | max_z & min_z |
| max_z & min_z | max_z & min_z | max_z & min_z |

The cell size in XY plane of a 3D Cube should be same as the nominal ground pixel resolution of the images to be used to generate 3D Images. If LIDAR data is used to generate 3D Cubes, then the LIDAR data should be acquired with a compatible data point spacing with the pixel resolution of the images.

Figures 2, 3:
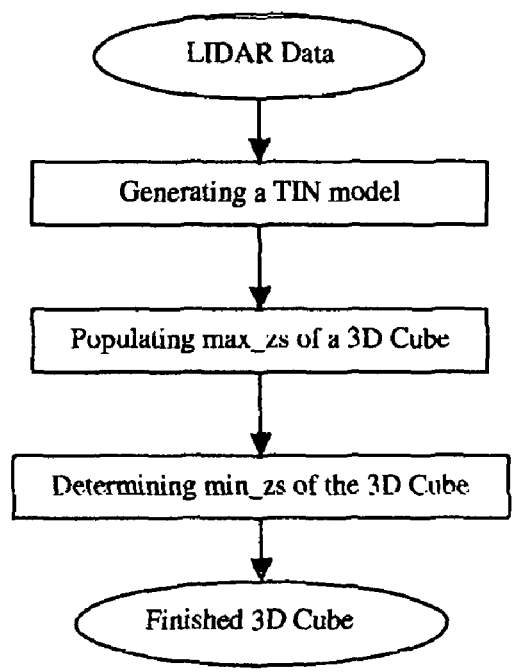
FIG. 2 shows the flowchart of the process of generating a 3D Cube.
FIG. 3 gives an example of how to generate a 3D Cube.

The process to generate a 3D Cube is as follows, see FIG. 2. Firstly, generate a Triangulated Irregular Network (TIN) model from the input ground surface elevation or range data, such as LIDAR data points. Secondly, populate the max_zs of the 3D Cube by interpolation from the TIN model. Then thirdly, determine the min_zs of the 3D Cube as described in the below example. When to determine the min_z of the center cell in FIG. 3, assuming cell_1 has the lowest elevation among cell_1,2,3,4 and cell_1 is lower than the max_z of the center cell, then min_z of the center cell should be equal to the elevation of cell_1. Otherwise, min_z is equal to max_z of the center cell.

Step2: Generating 3D Images

Figure 4:
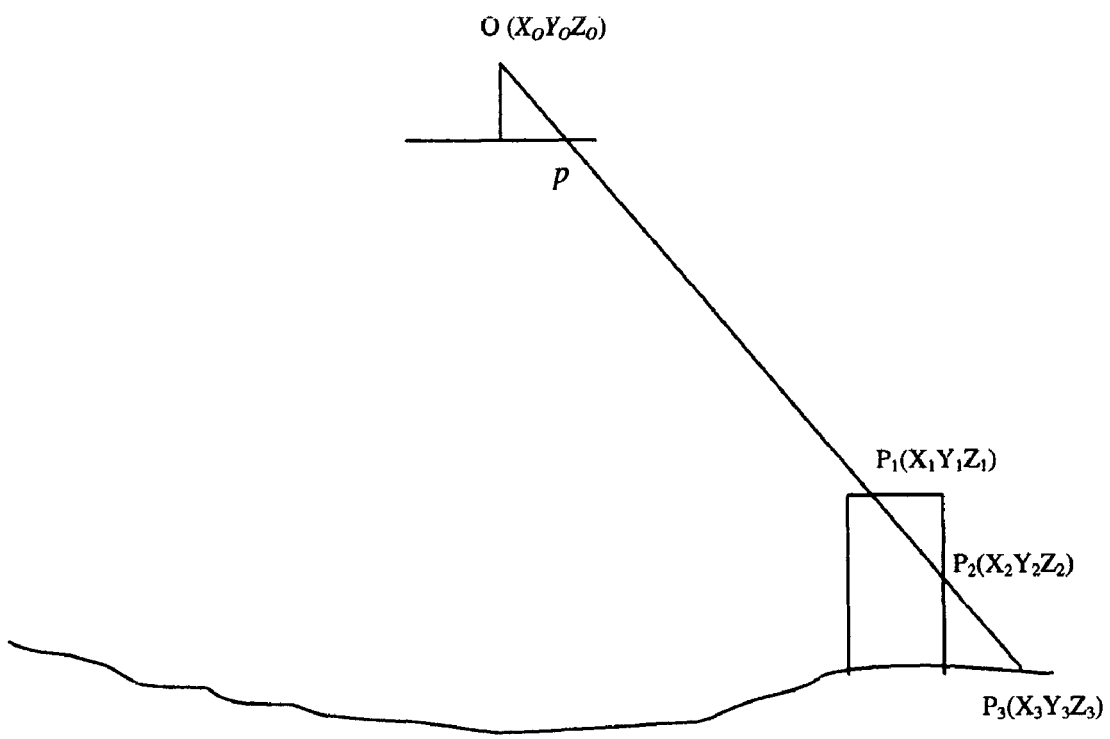
FIG. 4 illustrates the process of how to assign XYZ coordinates to an image pixel.

The process of generating a 3D Image for an input oblique or vertical image is a process of assigning XYZ coordinates (both max_z and min_z) of every cells of a 3D Cube to the pixels of the input image, where, the 3D Cube covers the ground coverage of the input image. The assigning of XYZ coordinates to a pixel of input image is determined by the Collinearity equations defined by Equations (1) and (2). Collinearity equations define the geometrical projection relationship between a ground point XYZ and its corresponding image pixel coordinates x and y of the input image. For some pixels of the input image, they may get multiple ground XYZ projections. In such a situation, the distance between a ground point and the corresponding image pixel is used to determine right of this ground point to assign its coordinates to the image pixel. FIG. 4 illustrates such a case. For pixel p in an input oblique or vertical image, its XYZ coordinates will be $P_1(X_1Y_1Z_1)$ because $P_1$ is closer to image exposure center O than $P_2$ or $P_3$ does.

Step3: Interpolating Blank Pixels

After the process of generating a 3D Image in Step2, some pixels of the generated 3D Image may have not been assigned with any 3D coordinates. Such a pixel is called blank pixel. This phenomenon is mainly due to that some area(s) of the input image may have finer pixel resolution than the cell size of the 3D Cube used to generate the 3D Image. The number of blank pixels in a 3D Image should be very limited and usually appear as individual and isolated points when the cell size of the 3D Cube used to generate the 3D Image is about same as the ground pixel resolution of the input image.

For blank pixels, 3D coordinates have to be assigned to them, which is done by an interpolation process. The interpolation process works as follows: for any blank pixel, its neighboring pixels that have 3D coordinates are used to interpolate a XYZ coordinates for the point. The interpolation process assumes the ground surface is continuous, i.e., together with the neighboring pixels the interpolated pixel should construct a continuous surface.

Figure 5:
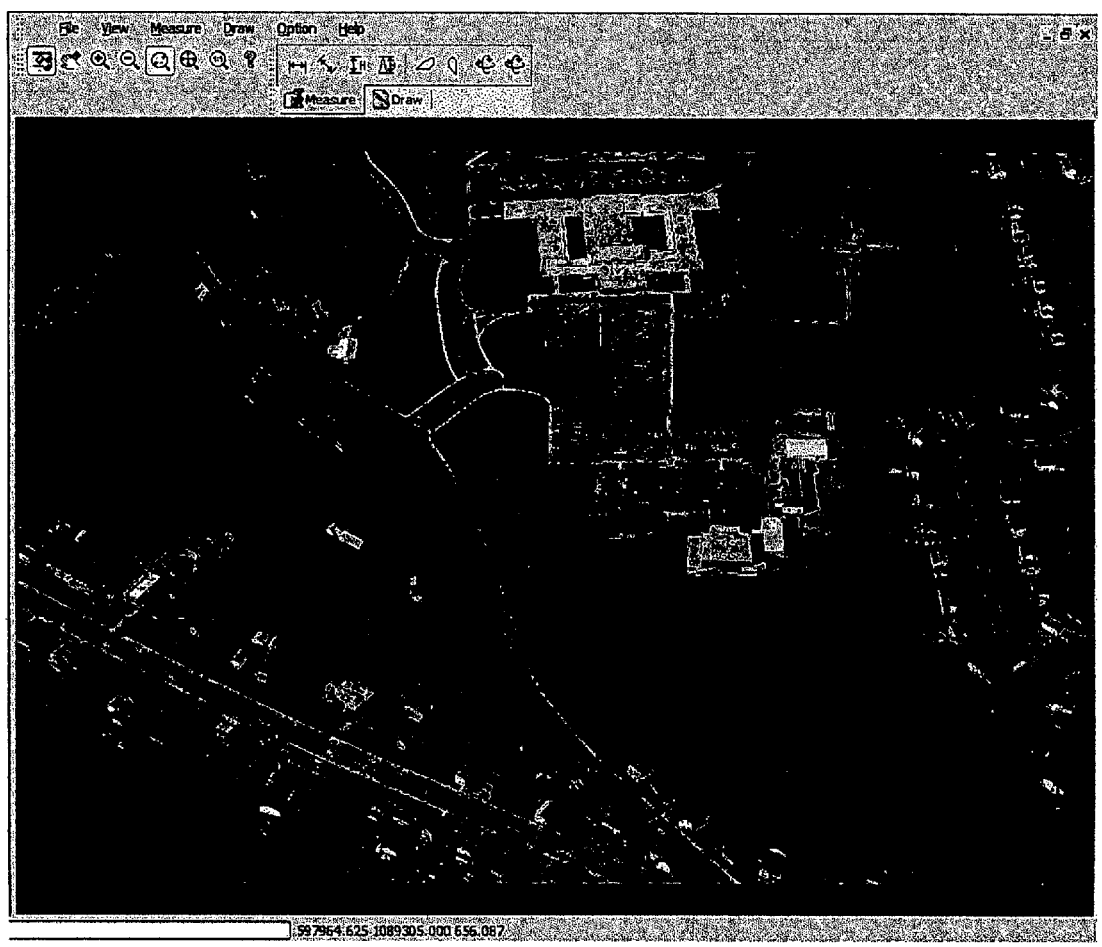
FIG. 5 shows an example of 3D Image.

The final product of the system is a 3D Image of ground surface for an input oblique or vertical image. Such a 3D Image is an image and has three-dimensional XYZ coordinates in a ground coordinate system for every pixel of the image. FIG. 5 shows an example of a 3D Image, where the 3D coordinates of the pixel pointed by the computer cursor are displayed in red at the bottom of the figure. The scene covered and represented by such a 3D Image is a three-dimensional real world scene where every visible thing in the 3D Image has 3D coordinates. Additionally, the coverage, the neighbor images, and indexing information of each 3D Image are generated as well and stored in an ASCII file or in a database. The 3D Images can be accessed and displayed on a local computer or through Internet.

The embodiments and examples set forth herein are presented to best explain the present invention and its practical application and to thereby enable those skilled in the art to make and utilize the invention. However, those skilled in the art will recognize that the foregoing description and examples have been presented for the purpose of illustration and example only. The description as set forth is not intended to be exhaustive or to limit the invention to the precise form disclosed. Many modifications and variations are possible in light of above teaching without departing from the spirit and scope of the following claims. For instance, the input imagery to the system of this invention can be geo-referenced terrestrial imagery or satellite imagery; the input ground surface elevation or range data to the system can be from RADAR data, photogrammetric compilation, or image matching process; and the geo-referencing of the input data can be from conventional photogrammetric methods or any other methods that make geo-referencing possible. Additionally, the 3D Cube can be represented by a full size model, instead of only storing the max_zs and min_zs. Further more, the blank pixels of a 3D Image can be interpolated or filled by other methods. And further more, a 3D Image can be stored in any format or way as long as all the pixels of the image are associated with their corresponding coordinates and all the pixels of the image and their corresponding coordinates together are accessible for displaying, viewing, measuring, and any manipulating.

What is claimed is:

1. A method of generating a 3D airborne Image of a ground surface, comprising the steps of:
    obtaining the input data of said airborne imagery, said ground surface elevation or range data, and the geo-referencing data;
    creating a geometric model for said ground surface wherein said geometric model employing a three dimensional cube that is a three-dimensional grid representation of the around surface elevation;
    generating said airborne three-dimensional image for said ground surface utilizing said geometric model, where every pixel of said three-dimensional airborne image has three-dimensional XYZ coordinates in a coordinate system, outputting said three-dimensional airborne images.

2. The method of claim 1 wherein the input data further comprises an aerial oblique or vertical imagery data or terrestrial imagery data.

3. The method of claim 1 wherein the input data further comprises said ground surface elevation or range data which is from LIDAR data.

4. The method of claim 1 wherein the input data further comprises geo-referencing data that puts the input imagery data in a coordinate system where the input ground surface elevation or range data is registered.

5. (currently The method of claim 1 wherein said three-dimensional cube further comprises XY cells and each cell has two values max_z and min_z for said ground surface elevation or range.

6. The method of claim 1 wherein generating said three-dimensional airborne image further comprises assigning process that assigns ground coordinates to every pixel of an input image based on the collinearity equations that define the geometrical projection relationship between a ground point XYZ and its corresponding image pixel.

7. A system of generating a three-dimensional airborne image of a ground surface, comprising:
- means for obtaining the input data of said airborne imagery, said ground surface elevation or range data, and the geo-referencing data;
- means for creating a geometric model for said ground surface wherein said geometric model employing a three dimensional cube that is a three-dimensional arid representation of the around surface elevation;
- means for generating said three-dimensional airborne image for said ground surface utilizing said geometric model, where every pixel of said three-dimensional airborne image has three-dimensional XYZ coordinates in a coordinate system,
- means for outputting said three-dimensional airborne images.

8. The system of claim 7 wherein said means for obtaining input imagery includes aerial digital or film cameras for oblique or vertical imagery and terrestrial digital or film cameras.

9. The system of claim 7 wherein said means for obtaining input ground surface elevation or range data includes LIDAR, RADAR, and photogrammetric compilation, or image matching processes.

10. The system of claim 7 wherein said means for obtaining geo-referencing data includes GPS/IMU or any photogrammetric methods.

11. The system of claim 7 wherein said means for generating said three-dimensional airborne image includes means for assigning ground coordinates to every pixel of the image.

12. The system of claim 7 wherein said means for outputting said three-dimensional airborne images includes means for storing in a database, accessing or displaying on a local computer or through Internet.

13. The system of claim 7 wherein said means for outputting said three-dimensional airborne images includes means for generating and displaying three-dimensional perspective views of ground surface and three-dimensional fly-through or walk-through of ground surface.

14. The system of claim 7 wherein said means for outputting said three-dimensional airborne images includes means for three-dimensional rotation, zoom-in, zoom out of ground surface.

15. The system of claim 7 wherein said means for outputting said three-dimensional airborne images includes means for simulating three-dimensional perspective views of ground surface.

16. The system of claim 7 wherein said means for outputting said three-dimensional airborne images includes means for utilizing said three-dimensional images as the foundational data layer in a geo-referenced three-dimensional ground surface modeling system.

17. A computer readable medium encoded with a computer readable program to execute a method of generating a three-dimensional airborne image of said ground surface, comprising the steps of:
- obtaining the input data of said airborne imagery, said ground surface elevation or range data, and the geo-referencing data;
- creating a geometric model for said ground surface; wherein said geometric model employing a three dimensional cube that is a three-dimensional arid representation of the around surface elevation;
- generating said three-dimensional airborne image for said ground surface utilizing said geometric model, where every pixel of said three-dimensional airborne image has three-dimensional XYZ coordinates in a coordinate system, outputting said three-dimensional airborne images.

* * * * *